UNITED STATES PATENT OFFICE.

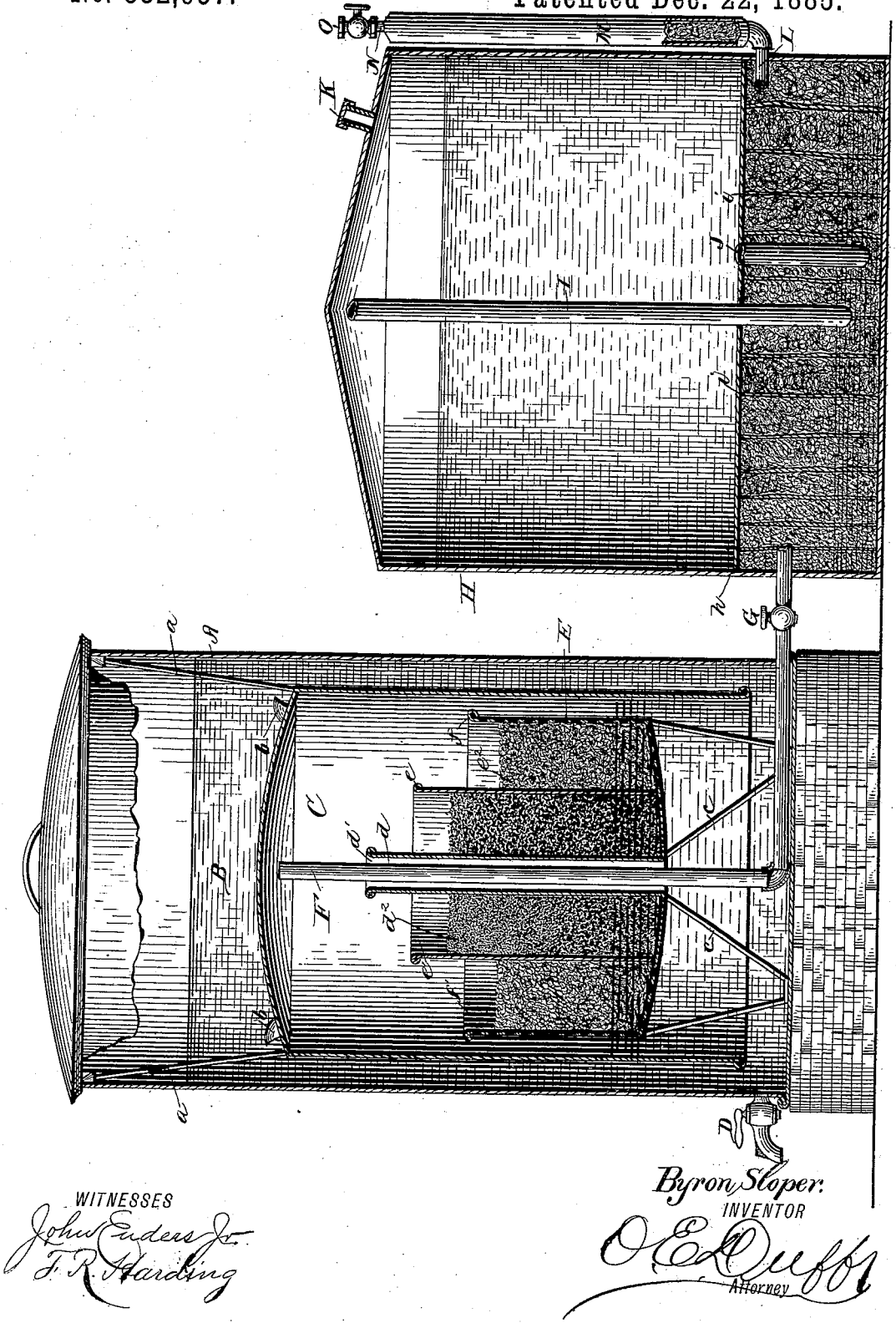

BYRON SLOPER, OF NEW YORK, N. Y.

PROCESS OF MANUFACTURING ILLUMINATING-GAS.

SPECIFICATION forming part of Letters Patent No. 332,957, dated December 22, 1885.

Application filed August 27, 1885. Serial No. 175,493. (No model.)

*To all whom it may concern:*

Be it known that I, BYRON SLOPER, of New York city, in the county of New York and State of New York, have invented certain new and useful Improvements in Process of Manufacturing Illuminating-Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to the manufacture of illuminating-gas by a process and apparatus adapted for domestic purposes and for use in hotels, factories, and other places where light and heat are required; and the object of the invention is to produce gas in greatly-increased volumes and at a nominal cost when compared with the methods of manufacture now in use; also, to produce a carbureted water-gas which shall be safe in use and practically free from the noxious elements so largely present in the water-gases as ordinarily manufactured in large gas-works.

With these objects in view I have invented a new and improved process, which consists in, first, automatically generating a water-gas composed of hydrogen and carbonic acid by the action of dilute acid upon metallic scrap or turnings, and simultaneously the action of the dilute acid upon carbonate of lime or marble-dust, whereby a greatly-increased volume of gas is produced without increased cost, and, second, conveying the mixed gases into a carbureting-chamber, and there adding the required amount of hydrocarbon to make a brilliant illuminating-gas. The proportion of hydrogen generated may be increased, and the proportion of carbonic acid decreased to any desired degree at will, or hydrogen alone may be generated, as preferred. The gas is practically free from carbonic oxide and sulphur impurities.

In the drawings hereto annexed I have shown a mechanism by means of which I can carry out my improved processes, and, referring to said drawings by letters—

A is the generator, and H the carburetor. Acidulated water B (say one part of sulphuric acid to ten parts of water) is contained within the generator, which has suspended in it by means of hangers $a$ an inverted bell, C, provided with suitable handles, $b$, for convenience in handling. This bell is of slightly less diameter than the generator-tank A, and its lower end reaches to within a short distance of the bottom of the generator, the latter being supported on any suitable foundation, and having at its bottom a cock or faucet, D, for cleansing or emptying it.

Supported within the bell C, upon legs or supports $c$, is a vessel, E, consisting of three concentric cylinders, $e$ and $f\ d$. Each of the cylinders $e$ and $f$ is open at the top, and has a perforated bottom, while the outer cylinder is also perforated through its sides. These cylinders form three chambers, $d'\ e'\ f'$, the first of which, $d'$, is bottomless, and forms a passage for a pipe, to be hereinafter described. The second chamber, $e'$, is a receptacle for marble-dust, $d^2$, and the third chamber, $f'$, surrounding the chamber $e'$, is a receptacle for iron turnings or scraps, $e^2$.

The whole vessel just described is of less height and diameter than the bell in which it is inclosed.

F is a pipe open at its top, and extending downwardly from near the top of the bell through the chamber $d'$, and out throught he generator to the carburetor M. It is provided with a suitable valve, G, between the generator and carburetor, and ends in one side of the carbureting-chamber. This chamber is separated from the oil tank or reservoir H by a partition or diaphragm, $h$, and the two are connected by suitable supply and vent pipes. Within the carburetor are arranged concentric cylinders of lamp-wicking $i$, the spaces between which are filled in with excelsior. A pipe, I, open at the top, extends from near the top of the oil-reservoir down through the partition $h$ into the carburetor, and its open lower end reaches nearly to the bottom of said carbureting-chamber among the lamp-wicking and excelsior. A pipe, J, with open top and bottom, reaches from the bottom of the upper chamber or oil-reservoir through the partition and to near the bottom of the lower chamber, its lower end being slightly lower or nearer the bottom than is the lower end of the pipe I. A filling-opening having cap K is provided in the top of the carburetor. A pipe, L, leads from the upper portion of the carburetor to a scrubber, M, closely packed with excelsior, and having an egress or outlet pipe, N, at its top, provided with a suitable valve, O.

The operation is as follows: I first charge the outer chamber, $f'$, of the vessel E with iron turnings or scraps, then the inner chamber, $e'$, with washed marble-dust. I then place the bell or receiver in position over the vessel containing the marble-dust and iron turnings, said bell being securely locked in place, as shown. The generator is now filled with water, so as to entirely cover and submerge the bell. To this water is added sulphuric acid, say in or about the proportions of one part of acid to ten of water. The communication between the generator and carburetor being previously closed, the carburetor is now charged with spirit of petroleum or other light carbonaceous material, when the apparatus is ready for operation. The communication between the generator and carburetor being now opened, the acidulated water, coming in contact with the marble-dust and iron turnings through the perforated bottom of the chamber $e'$ and the perforated bottom and sides of the chamber $f'$, will generate, respectively, hydrogen and carbonic-acid gas, which, rising in great volume above the chambers in the bell, will pass through the pipe F into the carbureting-chamber M, the two gases being mixed together in the bell after being simultaneously generated in the chambers. The oil-reservoir of the carburetor being charged with the hydrocarbon fluid, as before stated, such fluid will pass down through the pipe J into the lower chamber until it reaches high enough therein to cover the lower end of the pipe L. As a further flow of the fluid would create a vacuum in the upper chamber, the flow is stopped until the fluid in the lower chamber, again falling below the end of pipe I, breaks the seal, allows the gas to pass up through said pipe, and again starts the flow, thus automatically, by what I call the "vacuum system," regulating the flow between the upper and lower chambers, and keeping the level of the liquid in the lower chamber at any desired height for carbureting uniformly and producing always the same quality of illuminating-gas. The mixed gases coming into the lower chamber will pass therefrom by the pipe L through the excelsior packing in the scrubber M, where they will be freed of any superfluous moisture or foreign substances. The packing of excelsior between the concentric layers of lamp-wicking acts as a spring to support the lamp-wicking and to uniformly diffuse and distribute the gases through the lamp-wicking, thereby presenting the most extensive carbureting-surface.

Having thus described my invention, I claim and desire to secure by Letters Patent of the United States—

1. The process herein described of automatically generating gas, which consists in simultaneously subjecting a body of metallic scrap or turnings and a body of marble-dust or carbonate of lime to the action of dilute acid in a closed chamber.

2. The process herein described of automatically generating illuminating-gas, which consists in, first, producing water-gas by simultaneously subjecting metallic scrap or turnings and carbonate of lime to the action of dilute acid, and, second, carbureting the resulting gas with hydrocarbon vapor.

In testimony that I claim the foregoing as my own I affix my signature in presence of two witnesses.

BYRON SLOPER.

Witnesses:
  O. E. DUFFY,
  S. BRASHEARS.